(12) United States Patent
Heo (10) Patent No.: US 11,131,216 B2
(45) Date of Patent: Sep. 28, 2021

(54) SUPPORT UNIT FOR POWER UNIT, AND TURBINE HAVING THE SAME

(71) Applicant: DOOSAN HEAVY INDUSTRIES & CONSTRUCTION CO., LTD., Changwon-si (KR)

(72) Inventor: Young Seok Heo, Changwon-si (KR)

( * ) Notice: Subject to any disclaimer, the term of this patent is extended or adjusted under 35 U.S.C. 154(b) by 861 days.

(21) Appl. No.: 15/928,093

(22) Filed: Mar. 22, 2018

(65) Prior Publication Data

US 2018/0320555 A1 Nov. 8, 2018

(30) Foreign Application Priority Data

May 2, 2017 (KR) .......................... 10-2017-0056055

(51) Int. Cl.
| | |
|---|---|
| *F01D 25/26* | (2006.01) |
| *F01D 25/28* | (2006.01) |
| *F01D 21/14* | (2006.01) |
| *F02C 7/20* | (2006.01) |
| *F01D 25/16* | (2006.01) |

(52) U.S. Cl.
CPC ............ *F01D 25/26* (2013.01); *F01D 21/14* (2013.01); *F01D 25/164* (2013.01); *F01D 25/28* (2013.01); *F02C 7/20* (2013.01); *F05D 2220/31* (2013.01); *F05D 2220/32* (2013.01); *F05D 2240/14* (2013.01); *F05D 2240/50* (2013.01); *F05D 2260/941* (2013.01)

(58) Field of Classification Search
None
See application file for complete search history.

(56) References Cited

U.S. PATENT DOCUMENTS

| | | | | |
|---|---|---|---|---|
| 4,050,660 A | * | 9/1977 | Eggmann | ................ F01D 25/28 248/676 |
| 8,001,790 B2 | * | 8/2011 | Ichiryu | ..................... F02C 7/20 60/796 |
| 8,083,471 B2 | * | 12/2011 | Black | ..................... F01D 25/28 415/142 |
| 10,197,213 B2 | * | 2/2019 | Tiemon | .................... F16M 7/00 |

(Continued)

FOREIGN PATENT DOCUMENTS

| | | |
|---|---|---|
| JP | 4859688 B2 | 1/2012 |
| KR | 10-1579043 B1 | 12/2015 |
| KR | 10-2016-0071271 A | 6/2016 |

*Primary Examiner* — David E Sosnowski
*Assistant Examiner* — Jason Fountain
(74) *Attorney, Agent, or Firm* — Harvest IP Law, LLP (57) ABSTRACT

A support unit for a power unit reliably absorbs thermal deformation of the power unit due to thermal deformation of a casing and enables the center of the casing to be effectively maintained at a correct position. The support unit includes a supporting unit and a stress supporting unit. The supporting unit includes a first support configured to support a front part of the casing of the power unit, and a second support configured to support a rear part of the casing and provided with an auxiliary support configured to receive and support a weight of the casing. The stress supporting unit is disposed under the rear part of the casing and receives heat from the casing and primarily absorb stress resulting from thermal expansion of the casing. Stress in the casing resulting from the thermal expansion is secondarily damped by the second support via the stress supporting unit.

18 Claims, 8 Drawing Sheets

(56) References Cited

U.S. PATENT DOCUMENTS

| | | | |
|---|---|---|---|
| 2010/0031672 A1* | 2/2010 | Ichiryu | F01D 25/28 60/796 |
| 2010/0272558 A1* | 10/2010 | Black | F01D 25/14 415/142 |
| 2018/0209578 A1* | 7/2018 | Tiemon | F01D 15/04 |

* cited by examiner

SUPPORT UNIT FOR POWER UNIT, AND TURBINE HAVING THE SAME

CROSS-REFERENCE TO RELATED APPLICATIONS

This application claims priority to Korean Patent Application No. 10-2017-0056055, filed on May 2, 2017 the disclosure of which is incorporated herein by reference in its entirety.

BACKGROUND OF THE INVENTION

Field of the Invention

Exemplary embodiments of the present invention relate to coping with thermal deformation of a casing forming the appearance of a power unit, and more particularly, to a support unit for a power unit, and a turbine having the support unit.

Description of the Related Art

Generally, a turbine is a machine which generates rotating force from impulsive force or reaction force using the flow of compressive fluid such as steam or gas. The turbine is classified into a steam turbine using steam, a gas turbine using high-temperature combustion gas, and so forth.

The gas turbine chiefly includes a compressor, a combustor, and a turbine. The compressor includes an air inlet into which air is introduced, and a plurality of compressor vanes and a plurality of compressor blades which are alternately provided in a compressor casing.

The combustor is configured to supply fuel to air compressed by the compressor and ignite the fuel mixture using a burner, thus generating high-temperature and high-pressure combustion gas.

The turbine includes a plurality of turbine vanes and a plurality of turbine blades which are alternately arranged in a turbine casing. Furthermore, a rotor is passed through central portions of the compressor, the combustor, the turbine, and an exhaust chamber.

Opposite ends of the rotor are rotatably supported by bearings. A plurality of disks are fixed to the rotor, and the blades are coupled to the corresponding disks, respectively. A driving shaft of a generator or the like is coupled to an end of the rotor that is adjacent to the exhaust chamber.

The gas turbine does not have a reciprocating component such as a piston of a four-stroke engine. Therefore, mutual friction parts such as a piston-and-cylinder are not present, so that there are advantages in that there is little consumption of lubricant, the amplitude of vibration is markedly reduced unlike a reciprocating machine having high-amplitude characteristics, and high-speed driving is possible.

In the operation of the gas turbine, air compressed by the compressor is mixed with fuel, the fuel mixture is combusted to generate high-temperature combustion gas, and the generated combustion gas is discharged to the turbine. The discharged combustion gas passes through the turbine vanes and the turbine blades and thus generates rotating force, by which the rotor is rotated.

SUMMARY OF THE INVENTION

Various embodiments of the present invention are directed to a support unit for a power unit, e.g., a gas turbine, which supports a casing forming the outer appearance of the power unit and is able to absorb and cope with thermal deformation of the casing.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a support unit for a power unit may include a supporting unit and a stress supporting unit. The supporting unit may include a first support configured to support a front part of a casing of the power unit, and a second support configured to support a rear part of the casing and provided with an auxiliary support configured to receive and support a weight of the casing. The stress supporting unit may be disposed under the rear part of the casing and configured to receive heat from the casing and primarily absorb stress resulting from thermal expansion of the casing, wherein stress in the casing resulting from the thermal expansion may be secondarily damped by the second support via the stress supporting unit.

In an embodiment, the support unit may further include a first extension extending from each of left and right side surfaces of the casing to the auxiliary support.

In an embodiment, the auxiliary support may include a first bearing into which an end of the first extension is inserted, the first bearing coming into rolling contact with an inner surface of the second support.

In an embodiment, the stress supporting unit may include a first stress support having a tubular shape and including a first end coupled to a connector unit disposed on a central portion of a lower surface of the casing, and a second end extending toward the second support; a second stress support coupled to each of the first and second ends of the first stress support; a first support plate to which a lower end of the second stress support is fixed, the first support plate extending toward the second support; and a second extension extending from a second support plate to the second support, the second support plate including a first end fixed to the first support plate and a second end extending upward.

In an embodiment, the first stress support may extend to form a bilateral symmetrical structure based on the connector unit. The connector unit and the first stress support may be made of material having a high heat transfer coefficient. The first stress support may have a constant diameter or may be gradually reduced in diameter toward the second stress support. The first extension may extend, to the second support, by a length greater than a length of the second extension. The second stress support may be perpendicular to the second end of the first stress support. The first support plate may extend horizontally and have a substantially planar shape. The first stress support may be provided with a ball joint on the first end the first stress support. The second support plate may have a width and a height greater than a width and a height of the second stress support. When a length corresponding to a diameter of the casing is L, the first stress support may extend by a length of at least 2L/3.

In an embodiment, the connector unit may include a first connector unit coming into close circumferential contact with the casing; and a second connector unit coming into close contact with a lower surface of the first connector unit, and having a size smaller than a size of the first connector unit, the second connector unit being horizontally concentric with the first connector unit.

In an embodiment, the support unit may further include a second bearing into which the second extension is axially inserted, the second bearing coming into rolling contact with an inner surface of the second support.

In an embodiment, the support unit may further include a damping unit provided on the first support plate at a position at which the damping unit faces a lower surface of the second connector unit and at which the second connector unit sags to a lowermost position.

In an embodiment, the support unit may further include a warning sound generator provided to generate a warning sound in response to an electrical signal received when the damping unit is pressed downward by the second connector unit.

In accordance with another aspect of the present invention, a gas turbine may include the support unit according to any of the above embodiments, or the power unit may employ one of a gas turbine and a steam turbine.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Terms or words used hereinafter should not be construed as having common or dictionary meanings, but should be construed as having meanings and concepts that comply with the technical spirit of the present invention on the basis of the principle that the inventor may appropriately define the concepts of the terms in order to best describe his or her invention. Accordingly, the following description and drawings illustrate exemplary embodiments of the present invention and do not fully represent the scope of the present invention. It would be understood by one of ordinary skill in the art that a variety of equivalents and modifications of the embodiments exist.

Embodiments of the present invention are described in detail below with reference to the accompanying drawings.

In the drawings, the width, length, thickness, etc. of each element may have been enlarged for convenience. Furthermore, when it is described that one element is disposed 'over' or 'on' the other element, one element may be disposed 'right over' or 'right on' the other element or a third element may be disposed between the two elements. The same reference numbers are used throughout the specification to refer to the same or like parts.

Before description of embodiments of the present invention, a basic configuration of a gas turbine capable of being used as a power unit of the present invention will be described with reference to the accompanying drawings. For reference, FIG. 1 shows a gas turbine to which the present invention is applicable.

Figure 1:
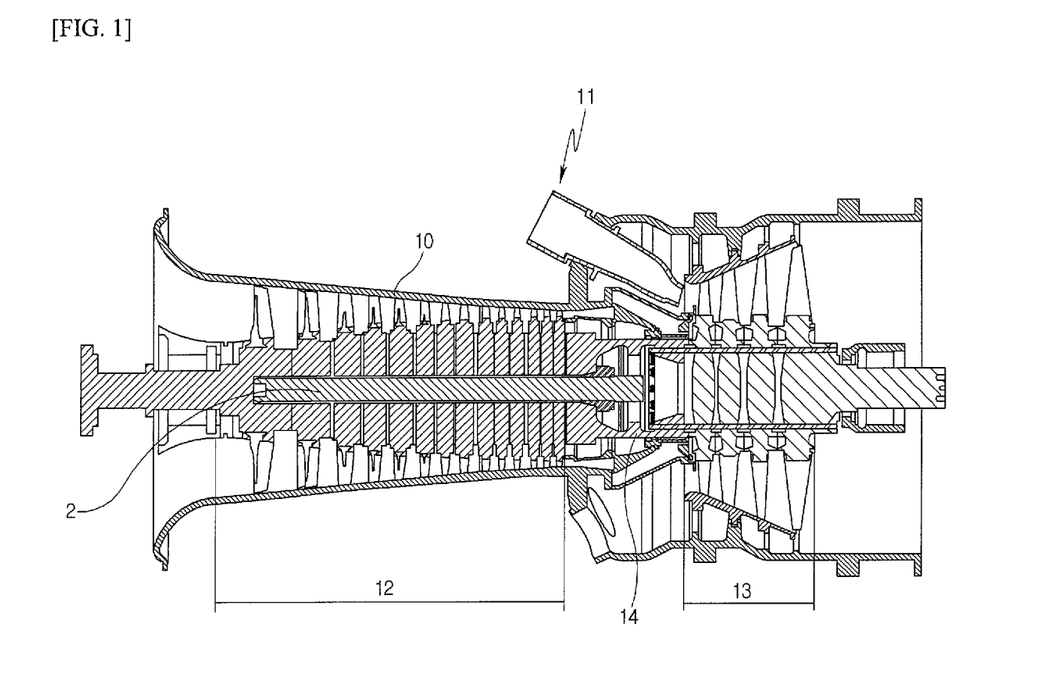
FIG. 1 is a side sectional view illustrating an example of a gas turbine to which the present invention is applicable.

Referring to FIG. 1, a gas turbine includes a casing 10 which forms the outer appearance of the gas turbine, and a diffuser which is provided in a rear part of the casing 10. Combustion gas passing through a turbine is discharged through the diffuser. A combustor 11, configured to receive compressed air and perform a combustion operation, is disposed ahead of the diffuser.

Based on airflow direction, a compressor 12 is disposed in an upstream portion of the casing 10, and the turbine 13 is provided in a downstream portion of the casing 10. A torque tube 14, functioning as a torque transmission unit for transmitting rotational torque generated from the turbine to the compressor 12, is provided between the compressor 12 and the turbine 13.

The compressor 12 is provided with a plurality (e.g., fourteen sheets) of compressor rotor disks. The compressor rotor disks are coupled by a rotor 2 such that they are not spaced apart from each other in an axial direction of the rotor 2. The compressor rotor disks are arranged in the axial direction of the rotor 2, which passes through respective central portions of the compressor rotor disks. A flange protruding in the axial direction is formed around an outer circumferential portion of each compressor rotor disk and is coupled to a neighboring rotor disk so as to prevent the adjacent rotor disks from rotating relative to each other.

A plurality of blades are radially coupled to an outer circumferential surface of each compressor rotor disk. Each of the blades includes a dovetail part by which the blade is coupled to the compressor rotor disk. The coupling method of the dovetail part may be classified as a tangential type or an axial type, depending on the structure of the gas turbine to be used. In some cases, a coupling device other than the dovetail part may be used to couple the blade to the rotor disk.

The rotor 2 is disposed so as to pass through the central portions of the compressor rotor disks. One end of the rotor 2 is coupled in the compressor rotor disk disposed at the most upstream position, and the other end is fixed to the torque tube. The shape of the rotor 2, which may have various structures depending on the structure of the gas turbine, is not limited to the shape proposed in FIG. 1. That is, a single rotor may be configured to pass through the central portions of the rotor disks, or may be alternatively configured.

Although not shown, a vane functioning as a guide vane may be installed in the compressor of the gas turbine at a position following the diffuser so as to adjust a flow angle of fluid to a design flow angle, the fluid entering the combustor after the pressure of the fluid has been increased. This vane is referred to as a deswirler.

The combustor 11 mixes introduced compressed air with fuel, combusts the fuel mixture to generate high-temperature and high-pressure combustion gas having high energy, and increases, through an isobaric combustion process, the temperature of the combustion gas to a temperature at which the combustor and heat-resistant parts of the turbine can withstand.

A combustion system of the gas turbine may include a plurality of combustors arranged in a casing formed in a cell shape or a shell shape. Each of the combustors includes a burner including a fuel injection nozzle and the like, a combustor liner forming a combustion chamber, and a transition piece serving as a connector between the combustor and the turbine.

In detail, the liner provides a combustion space in which fuel discharged from the fuel injection nozzle is mixed with compressed air supplied from the compressor and then combusted. The liner may include a flame tube for providing the combustion space in which the fuel mixed with air is combusted, and a flow sleeve for forming an annular space enclosing the flame tube. The fuel injection nozzle is coupled to a front end of the liner, and an ignition plug is coupled to a sidewall of the liner.

Meanwhile, the transition piece is connected to a rear end of the liner so as to transfer combustion gas combusted by the ignition plug toward the turbine. An outer wall of the transition piece is cooled by compressed air supplied from the compressor so as to prevent the transition piece from being damaged by high-temperature combustion gas. To this end, the transition piece has cooling holes through which air can be injected into an internal space of the transition piece. Compressed air cools a main body in the transition piece through the cooling holes and then flows toward the liner.

The cooling air that has cooled the transition piece may flow through the annular space of the liner. The cooling air may be compressed air provided from outside the flow sleeve, which flows through cooling holes formed in the flow sleeve and thus collides with an outer wall of the liner.

The air compressed outside the flow sleeve may be provided as the cooling air through the cooling holes provided on the flow sleeve and thus collide with the outer wall of the liner.

Generally, in the turbine, high-temperature and high-pressure combustion gas coming out of the combustor expands to apply driving force and reaction force to an impeller of the turbine, thus generating mechanical energy. Some of the mechanical energy obtained from the turbine is supplied as energy needed to compress air in the compressor, and the remaining mechanical energy is used to drive a generator and produce electric power.

The turbine is formed of a plurality of stators and a plurality of rotors which are alternately arranged in a turbine casing, and is configured such that the rotors are driven by combustion gas so as to rotate an output shaft coupled to the generator. For this operation, the turbine 13 includes a plurality of turbine rotor disks, and each turbine rotor disk has the same basic shape as the compressor rotor disk. Therefore, the turbine rotor disk also includes a flange provided for coupling with a neighboring turbine rotor disk, and a plurality of turbine blades which are radially provided. Each of the turbine blades may also be coupled to the turbine rotor disk in a dovetail coupling manner.

In the gas turbine having the above configuration, introduced air is compressed in the compressor 12, combusted in the combustor 11, transferred to the turbine 13 to drive the turbine 13, and then discharged to the atmosphere through the diffuser.

Hereinafter, an embodiment of the support unit for a power unit, which is capable of being applied to the above-described gas turbine, or to a turbine apparatus, will be described with reference to the accompanying drawings. For reference, FIG. 2 shows a power unit supported by the support unit of the present invention, and FIGS. 3 and 4 each show the casing of FIG. 2 supported by a stress supporting unit in accordance with respective embodiments of the present invention.

Figure 2:
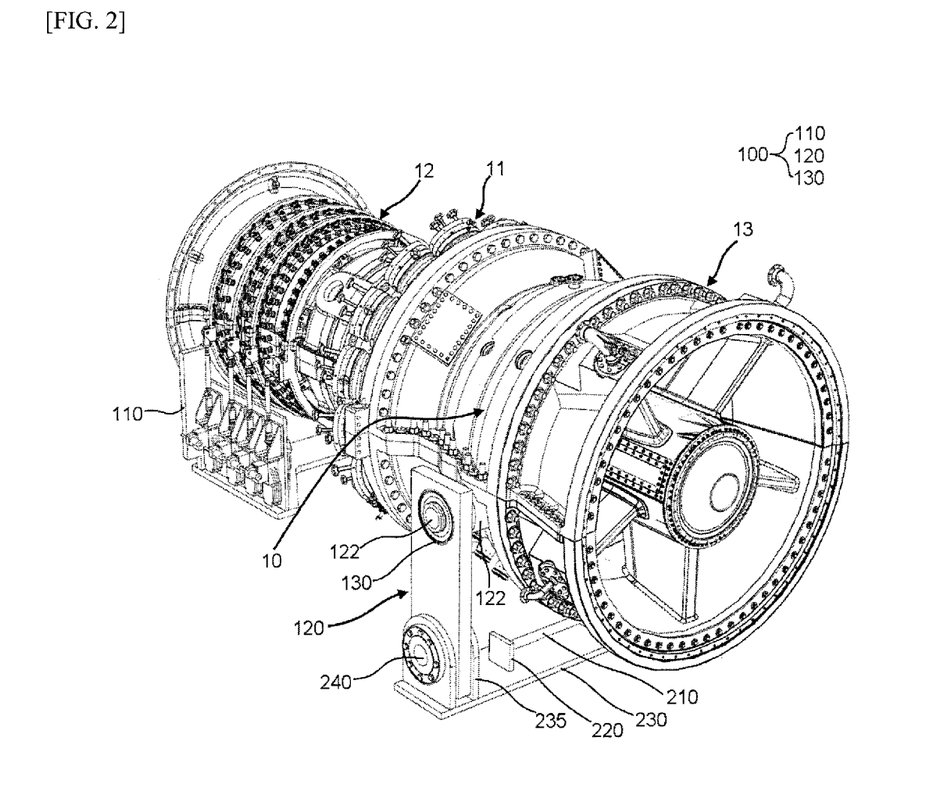
FIG. 2 is a rear perspective view illustrating a support unit for a power unit, in accordance with an embodiment of the present invention.
Figure 3:
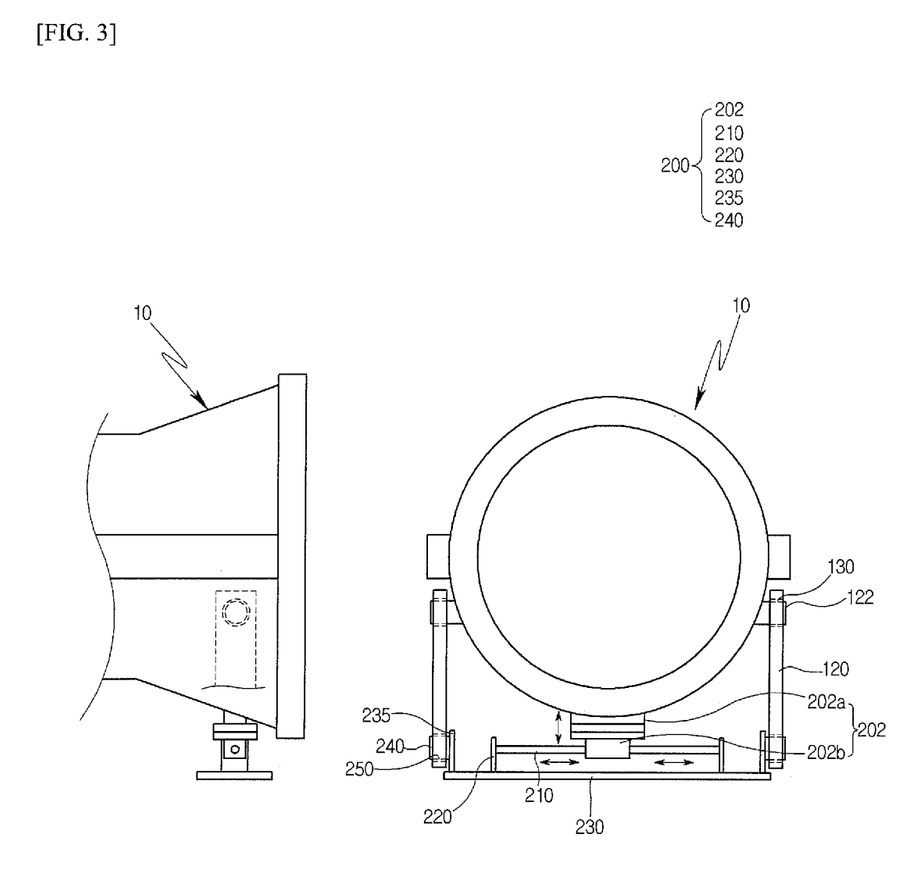
FIG. 3 is a side- and rear-view diagram illustrating a stress supporting unit in accordance with the embodiment of the present invention.
Figure 4:
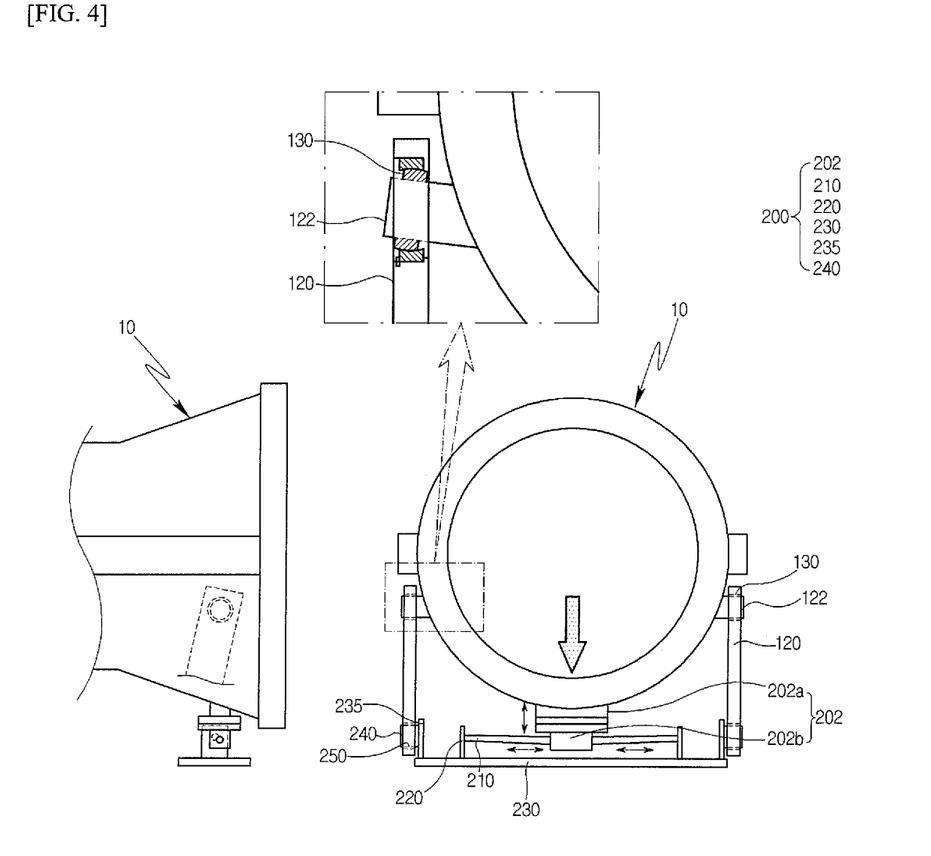
FIG. 4 is a side- and rear-view diagram illustrating a stress supporting unit in accordance with the embodiment of the present invention.

Referring to FIGS. 2 to 4, the support unit according to the present invention includes a supporting unit 100 and a stress supporting unit 200. The supporting unit 100 includes a first support 110 which supports a front part of the casing 10 that forms the outer appearance of the power unit, and a second support 120 which supports a rear part of the casing 10 and includes an auxiliary support 130 for receiving and supporting the weight of the casing 10. The stress supporting unit 200 is disposed under the rear part of the casing 10 and configured to receive heat from the casing 10 and primarily absorb stress resulting from a thermal expansion of the casing 10. The thermal expansion may occur in an axial direction and/or a circumferential direction of the casing 10. When thermal expansion of the casing 10 is a constant or ongoing condition, stresses caused by the expansion are secondarily damped by the second support 120 via the stress supporting unit 200.

The power unit supported by the support unit according to the present embodiment may be configured such that the compressor, the combustor, and the turbine that have been described above are respectively arranged along the axial direction of the casing 10. Particularly, when an axial shift displacement of the casing 10 is caused by thermal expansion, the stress supporting unit 200 functions to reliably absorb the axial shift displacement and prevent the casing 10 from being damaged.

If the power unit is normally operated, the turbine rotates at a high speed and generates high-temperature heat. Due to high-temperature conditions, axial and circumferential thermal expansion of the casing 10 is inevitably generated.

Although the length of the casing 10 may vary depending on the output of the power unit, the casing 10 typically has a length of a few meters to as much as ten meters or more. Thus, the axial thermal expansion of the casing 10 can be rather significant. This expansion is in addition to the circumferential thermal expansion of the casing 10 that may be generated.

The thermal expansion of the casing 10 may cause direct or indirect stress concentration on various components coupled to the casing 10. However, the present invention overcomes this problem by using the supporting unit 100 and the stress supporting unit 200.

The supporting unit 100 includes the first support 110 and the second support 120. The first support 110 is provided at a position at which the compressor is disposed, and functions to support the weight of the compressor. The second support 120 is provided at a position at which the turbine is disposed, and functions to support the weight of the turbine.

The first support 110 is disposed on each of the left and right sides of the casing 10 and extends from the ground. Here, the ground should be understood to be synonymous with a base or foundation that may exist under the structures of one or both of the first support 110 and the second support 120. In other words, the first support 110 extends upward from such a base or foundation.

The first support 110 may be coupled to the casing 10 in a typical flange coupling manner or, alternatively, in other manners. The first support 110, along with the second support 120 to be described below, remains fixed without relative axial movement due to the thermal expansion of the casing 10.

The second support 120 according to the present embodiment is provided to minimize, in cooperation with the stress supporting unit 200, a phenomenon in which stress resulting from thermal expansion is concentrated on a specific position or component.

The second support 120 is disposed on each side surface of the casing 10, that is, on the left and right sides of the casing 10 based on the drawings, and is coupled with a first extension 122 in a shaft coupling manner through the auxiliary support 130.

The second support 120 includes a plate P which is disposed on each of the left and right sides of the casing 10 and extends a predetermined length. The first extension 122 is coupled to an upper portion of the second support 120 described above, and a second extension 240 to be described later is coupled to a lower portion thereof.

For example, a rod or pipe having a circular cross-section may be used as the first extension 122. With regard to the installation position of the second support 120, when an imaginary plane is extended through the center of the casing 10 horizontally, the second support 120 is disposed at a predetermined position under the center of the casing 10, that is, below the plane. This positioning of the first extension 122 is advantageous in that it enables the first extension 122 to be stably coupled to each of the left and right sides of the casing 10. Also, when axial shift displacement is caused by thermal expansion of the casing 10, the first extension 122 can assist in stable movement of the casing 10 because the first extension 122 is disposed at a position close to the plane of the center of the casing 10.

The auxiliary support 130 according to the present embodiment may be in the form of a first bearing, into which an end of the first extension 122 is inserted, and which comes into rolling contact with an inner surface of the second support 120. For instance, a spiral bearing may be used as the first bearing applied to the auxiliary support 130. Alternatively, other types of bearings may also be used so long as they can provide a function similar to that of the spiral bearing. The spiral bearing is formed of an outer wheel and an inner wheel. The inner wheel is disposed inside the outer wheel and brought into rolling contact with the outer wheel so that the inner wheel can stably move in various directions relative to the outer wheel. The spiral bearing has an outer circumferential surface rounded outward in a cross-sectional view, as exemplified in FIG. 4, and is axially fitted over the first extension 122, so that the coupled state of the related components can be stably maintained.

In the present embodiment, when axial or circumferential shift displacement of the casing 10 is randomly generated by thermal expansion, the first bearing (auxiliary support 130) can move appropriately in response to the shift displacement of the casing 10, thus reliably absorbing thermal deformation due to the operation of the power unit.

Therefore, the phenomenon in which stress is concentrated on a specific portion of the casing 10 is not caused, whereby problems resulting from the stress concentration phenomenon can be fundamentally solved. In addition, the durability of the casing 10 can be enhanced, and an operation interruption event due to fatigue fracturing of the casing 10 can be fundamentally prevented from occurring.

The stress supporting unit 200 according to the present embodiment includes a first stress support 210, a second stress support 220, a first support plate 230, a second support plate 235, and the second extension 240. The first stress support 210 has a tubular shape extending between first and second ends of the first stress support 210. The first end is coupled to a connector unit 202 disposed on a central portion of a lower surface of the casing 10, and the second end extends toward the second support 120, that is, away from the centrally disposed connector unit 202, to be coupled to the second stress support 220. Thus, the second stress support 220 is coupled with each of left and right extended ends of the first stress support 210. Meanwhile, a lower end of the second stress support 220 is fixed to the first support plate 230. The first support plate 230 extends, at either end, toward the second support 120. The second support plate 235 has a first end fixed to the first support plate 230 and a second end which extends upward. The second extension 240 extends from the second support plate 235 to the second support 120.

When seen in a rear view of the casing 10, the first stress support 210 extends to form a bilateral symmetrical structure based on the connector unit 202. For example, a rod having a constant diameter may be used as the first stress support 210, and the first stress support 210 extends to form a bilateral symmetrical structure. Consequently, when heat is transferred from the casing 10 to the first stress support 210 through the connector unit 202, left and right shift displacements of the first stress support 210 due to thermal expansion are the same as or similar to each other.

In other words, when the first stress support 210 thermally expands in the axial direction of the first stress support 210, the left shift displacement thereof is similar to the right shift displacement thereof. Thus, the casing 10 can be stably supported without being biased to the left or the right.

The connector unit 202 and the first stress support 210 are made of material having a high heat transfer coefficient, wherein heat transfer must be performed in the axial direction of the connector unit 202 and the first stress support 210 so that the connector unit 202 and the first stress support 210 can reliably absorb thermal deformation of the casing 10.

The first stress support 210 is made of a metal having a high heat transfer coefficient, but the material thereof is not limited to a specific material.

When a length corresponding to the diameter of the casing 10 is L, the first stress support 210 extends a length of 2L/3 or more. The extension length of the first stress support 210 is determined as the above length value (2L/3), when expanding in the axial direction, taking into account that the connector unit 202 may sag depending on the length of the first stress support 210.

For example, if the first stress support 210 is longer than the length determined as above, there is an advantage in that thermal expansion of the casing 10 can be reliably absorbed, but, if the first stress support 210 sags downward (in a 6 o'clock direction based on the drawings), interference may be caused by contact with the upper surface of the first support plate 230 to be described later. Therefore, the first stress support 210 preferably has a predetermined length within the above-mentioned length range.

Figure 5:
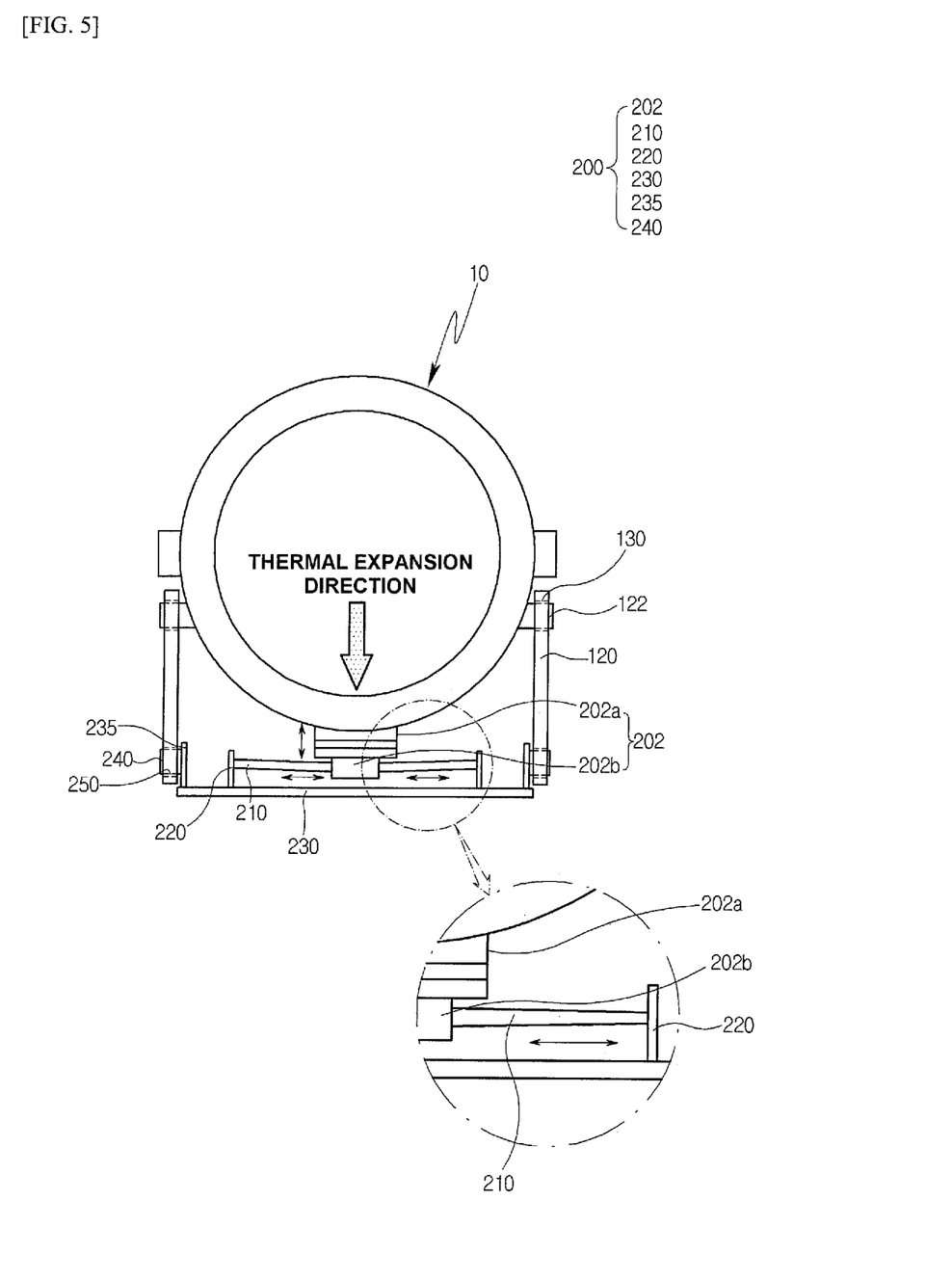
FIG. 5 is a diagram showing an enlargement of a portion of a first stress support in accordance with another embodiment of the present invention.

In the embodiment of FIG. 5, the first stress support 210 may be configured such that its diameter is gradually reduced toward the second stress support 220. This is in contrast with the embodiment of FIGS. 2-4.

In this case, with the reducing (tapering) diameter, high temperature heat transferred from the connector unit 202 is rapidly moved to the second stress support 220 through the first stress support 210.

As shown in FIG. 5, in reaction to a thermal expansion of the casing 10, shift displacement of the first stress support 210 may be generated in the axial direction of the first stress support 210, or the first stress support 210 may move, depending on thermal displacement generated in the radial or circumferential direction of the casing 10.

When heat is axially transferred through the first stress support 210 under the assumption that the first stress support 210 is made of solid material, heat transfer can be rapidly performed because the diameter of the first stress support 210 is gradually reduced toward the second stress support 220. In this case, shift displacement generated by thermal expansion of the casing 10 can be rapidly absorbed through the first stress support 210, whereby a stress concentration phenomenon due to the shift displacement can be minimized.

Figure 6:
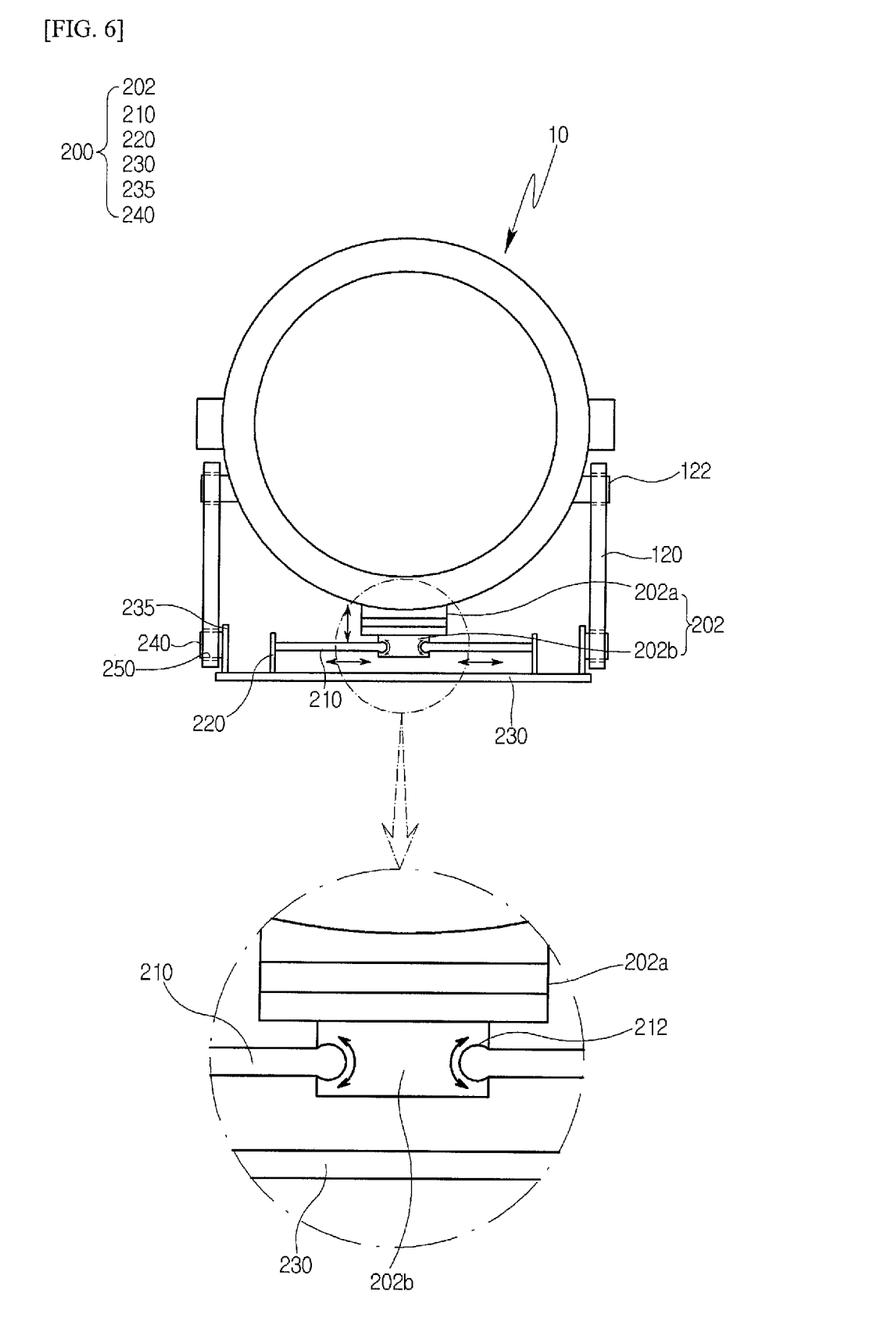
FIG. 6 is a diagram illustrating a damping unit provided in the support unit for a power unit, in accordance with another embodiment of the present invention.

Referring to FIG. 6, the first stress support 210 in accordance with another embodiment of the present invention may include a ball joint 212 provided on the first end of the first stress support 210, which is the end coupled to the connector unit 202.

The shape of the ball joint 212 is generally spherical, as shown in the drawing. However, the ball joint 212 is not limited to one having a spherical shape. The shape of the ball joint 212 may be varied, provided that the ball joint 212 has an outer circumferential surface that is rounded.

In the case where the first stress support 210 is provided with the ball joint 212, displacement movement due to thermal deformation generated in the axial direction of the first stress support 210 may be stably performed.

Furthermore, with regard to displacement movement due to circumferential or radial thermal deformation of the casing 10, the stability is enhanced because the movement can be embodied in various directions in the form of a joint by the ball joint 212.

The second stress support 220 according to the present embodiment perpendicularly intersects with the extended end (i.e., the second end) of the first stress support 210. The second stress support 220 has a lower end fixed to the upper surface of the first support plate 230. The second stress support 220 can reliably absorb shift displacement of the first stress support 210 because the second stress support 220 is perpendicular to the extended end (i.e., the second end) of the first stress support 210.

The second stress support 220 is provided to stably fix the first stress support 210 at a correct position thereof, regardless of axial or circumferential shift displacement of the casing 10 while the first stress support 210 absorbs the shift displacement of the casing 10 due to thermal expansion of the casing 10.

Although there is illustrated an example in which the first stress support 210 is fixed to the second stress support 220 by welding, it should be noted that various methods may be used to mitigate stress concentration on a junction between the first and second stress supports 210 and 220.

The first support plate 230 extends horizontally to have a substantially planar shape. The lower end of the second stress support 220 described above is fixed to the first support plate 230. The first support plate 230 has a predetermined width and length to stably support the stress supporting unit 200.

It is advantageous for the first support plate 230 not to be thermally expanded by heat transferred from the casing 10. To prevent heat transferred through the second stress support 220 from being conducted to the first support plate 230, a separate heat insulation pad (not shown) may be provided on the lower end of the second stress support 220.

The second support plate 235 according to the present embodiment is disposed on the upper surface of the first support plate 230, so as to face the second stress support 220, at a position spaced apart from the second stress support 220 by a distance suggested in the drawing. For example, the second support plate 235 is disposed at each of opposite (left and right) sides of the upper surface of the first support plate 230.

The second support plate 235 has a width and a height greater than those of the second stress support 220 and thus is able to stably support the second support 120 from below. For example, when displacement is generated in the axial direction of the casing 10, the center of the shift displacement is formed on the axis of the second extension 240 that is inserted into the second support plate 235. Given this, the second support plate 235 has a predetermined width and height to stably support the second extension 240.

In the present embodiment, the length that the first extension 122 extends to the second support 120 is greater than that of the second extension 240. In this case, axial shift displacement of the casing 10 due to thermal deformation can be more reliably transmitted to the auxiliary support 130.

A second bearing 250 coming into rolling contact with the second extension 240 in the axial direction of the second extension 240 is provided in the second support 120. The configuration, the operation, and effect of the second bearing 250 are similar to those of the first bearing (auxiliary support 130) described above. For example, a spiral bearing may be used as the second bearing 250. Alternatively, other types of bearings may also be used so long as they can provide a function similar to that of the spiral bearing.

As in the case of the spiral bearing (first bearing) of the auxiliary support 130, the spiral bearing of the second bearing 250 is formed of an outer wheel and an inner wheel. The inner wheel is disposed inside the outer wheel and brought into rolling contact with the outer wheel so that the inner wheel can move in various directions relative to the outer wheel. The spiral bearing has an outer circumferential surface rounded outward in a cross-sectional view, and is axially fitted over the second extension 240, so that the coupled state of the related components can be stably maintained.

In the present embodiment, when axial or circumferential shift displacement of the casing 10 is randomly generated by thermal expansion, the second bearing 250 can move appropriately in response to the shift displacement of the casing 10, thus reliably absorbing thermal deformation due to the operation of the power unit.

Therefore, the phenomenon in which stress is concentrated on a specific portion of the casing 10 is not caused, whereby problems resulting from the stress concentration phenomenon can be fundamentally solved. In addition, the durability of the casing 10 can be enhanced, and an operation interruption event can be fundamentally prevented from occurring due to fatigue fracturing of the casing 10.

The connector unit 202 according to the present embodiment includes a first connector unit 202a which comes into close circumferential contact with the casing 10, and a second connector unit 202b which comes into close contact with a lower surface of the first connector unit 202a. The second connector unit 202b has a size smaller than that of the first connector unit 202a and is arranged to be horizontally concentric with the first connector unit 202a.

The connector unit 202 functions as a medium for transferring heat generated from the casing 10 to the stress supporting unit 200. In this case, it is advantageous for a metal having a high heat transfer coefficient to be used as the material of the connector unit 202, so that heat can be rapidly transferred to the stress supporting unit 200.

The first connector unit 202a is disposed on the central portion of the lower surface of the casing 10 and is brought into close contact with the outer surface of the casing 10 with a predetermined depth extending in the radial direction of the casing 10. In this case, the first connector unit 202a may efficiently receive heat generated from the casing 10.

The second connector unit 202b is provided to function as a medium for connecting the first connector unit 202b with the first stress support 210 described above.

Figure 7:
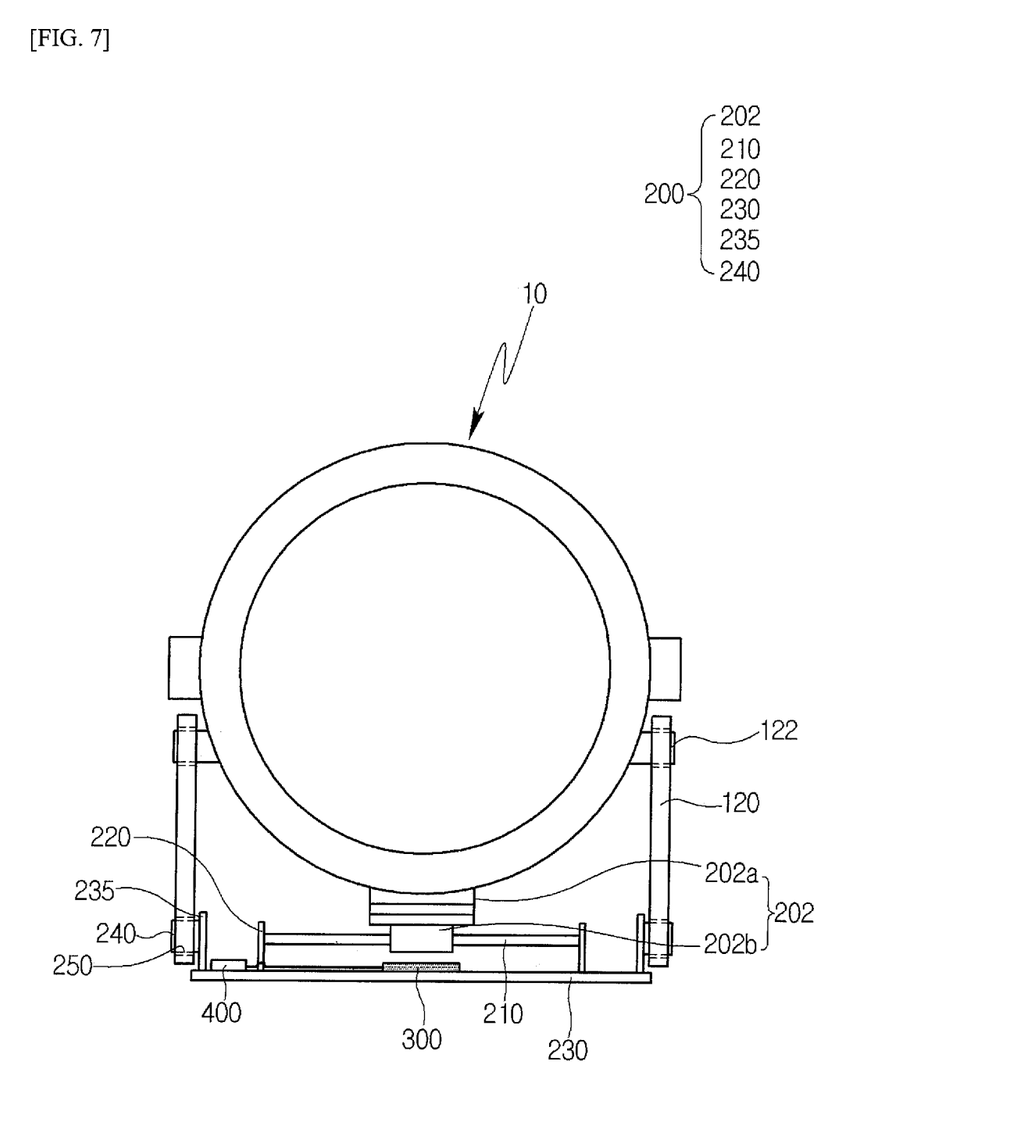
FIGS. 7 and 8 are diagrams illustrating the operation of the damping unit in accordance with another embodiment of the present invention.
Figure 8:
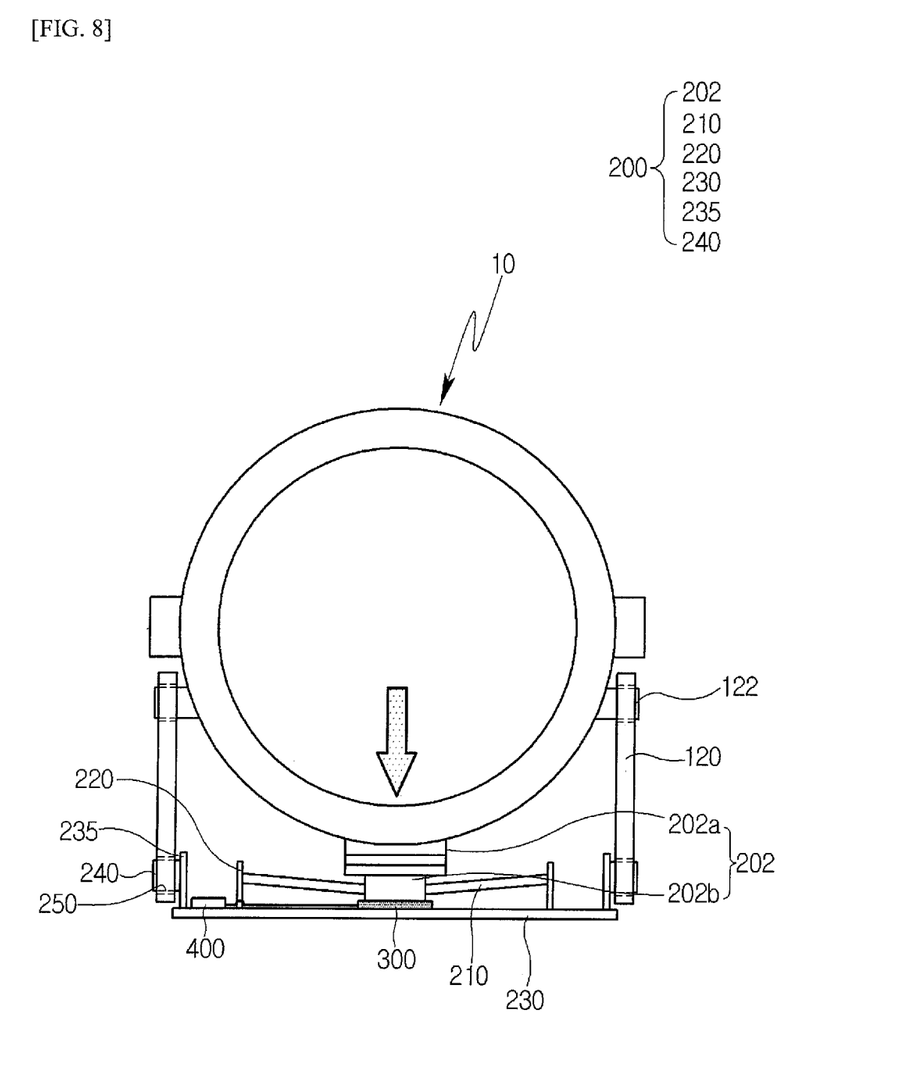

Referring to FIGS. 7 and 8, in accordance with another embodiment of the present invention, a damping unit 300 is provided on the first support plate 230 at a position at which the damping unit 300 faces a lower surface of the second connector unit 202b and at which the second connector unit 202b sags to the lowermost position.

The damping unit 300 may be made of rubber or an elastic body having elastic restoring force, or may be formed of a spring or the like. The damping unit 300 prevents the second connector unit 202b from colliding with the upper surface of the first support plate 230, thus preventing the second connector unit 202b from being damaged or deformed.

As shown in the drawings, the damping unit 300 is disposed below the central portion of the rear end of the casing 10. Thus, when the casing 10 maximally moves toward the ground, i.e., downward, the lower surface of the second connector unit 202b comes into contact with an upper surface of the damping unit 300, and the casing 10 can no longer move downward.

In this case, because the lower surface of the second connector unit 202b is prevented from directly colliding with the first support plate 230, the center of the casing 10 is prevented from becoming unstable, and it is possible to maintain the correct centering of the casing 10 constant by the damping unit 300. Furthermore, even if the centering of the casing 10 becomes slightly off center by axial or circumferential thermal expansion, the damping unit 300 can prevent the casing 10 from moving out of an allowable shift displacement range.

Therefore, thermal deformation of the casing 10 generated by the operation of the power unit can be reliably absorbed, and the center axis of the casing 10 can be prevented from becoming eccentrically disposed or twisted. Consequently, the structural stability of the casing 10 can be enhanced.

There is provided a warning sound generator 400 configured to generate a warning sound in response to an electrical signal received when the damping unit 300 is pressed toward the ground, or downward, by the second connector unit 202b.

When pressure is applied to the damping unit 300, the warning sound generator 400 receives an electrical signal and generates a warning sound. The electrical signal is generated from a separate sensor (not shown) provided to sense an applied pressure, so that the warning sound generator 400 can detect the pressure generated by contact with the second connector unit 202b.

When the warning sound generator 400 generates a warning sound, an operator near the power unit can hear the warning sound and recognize that the casing 10 is currently excessively shifted downward. Therefore, appropriate measures can be immediately taken.

As described above, various embodiments of the present invention provide a gas turbine having a support unit for a power unit. The support unit can reliably support axial or circumferential shift displacement of the casing 10 generated by thermal deformation of the casing 10 that encloses the gas turbine including the compressor, the combustor, and the turbine.

Particularly, because the turbine discharges high-temperature heat energy, the casing 10 may expand in the axial or circumferential direction. In the present invention, the support unit for supporting the casing 10 is able to absorb thermal expansion of the casing 10, thus reliably supporting the axial or circumferential shift displacement of the casing 10.

The power unit employed may be a gas turbine or a steam turbine. Although the embodiments of the present invention have been described as being applied to the gas turbine, the embodiments may be applied to the steam turbine, or other turbine apparatuses. Also, the range of application of the embodiments may be extended to any configuration for supporting an apparatus in which axial or circumferential shift displacement is caused by heat generated by, or present in, the apparatus.

In accordance with embodiments of the present invention, even when axial or circumferential shift displacement of a casing forming the outer appearance of a gas turbine is generated by thermal deformation of the casing, a support unit can stably support the casing and absorb the shift displacement, thus minimizing a phenomenon in which stress is concentrated on a specific portion of the casing.

Embodiments of the present invention make it possible to maintain the centering of the casing of a gas turbine in response to the axial or circumferential shift displacement of the casing.

In embodiments of the present invention, stress is dispersed to a stress supporting unit rather than being concentrated on a supporting unit for supporting the casing. Therefore, the casing, which is relatively heavy, can be stably supported.

While the present invention has been described with respect to the specific embodiments, it will be apparent to those skilled in the art that various changes and modifications may be made without departing from the spirit and scope of the invention as defined in the following claims.

What is claimed is:

1. A support unit for a power unit, comprising:
a supporting unit comprising a first support configured to support a front part of a casing of the power unit, and a second support configured to support a rear part of the casing and provided with an auxiliary support configured to receive and support a weight of the casing; and
a stress supporting unit disposed under the rear part of the casing and configured to receive heat from the casing and primarily absorb stress resulting from thermal expansion of the casing,
wherein stress in the casing resulting from the thermal expansion is secondarily damped by the second support via the stress supporting unit,
wherein the stress supporting unit comprises:
a first stress support having a tubular shape and including a first end coupled to a connector unit disposed on a central portion of a lower surface of the casing, and a second end extending toward the second support;
a second stress support coupled to each of the first and second ends of the first stress Support;
a first support plate to which a lower end of the second stress support is fixed, the first support plate extending; toward the second support, and
a second extension extending from a second support plate to the second support, the second support plate including a first end fixed to the first support plate and a second end extending upward,
wherein the first stress support is gradually reduced in diameter toward the second stress support.

2. The support unit according to claim 1, further comprising:
a first extension extending from each of left and right side surfaces of the casing to the auxiliary support.

3. The support unit according to claim 2, wherein the auxiliary support comprises a first bearing into which an end of the first extension is inserted, the first bearing coming into rolling contact with an inner surface of the second support.

4. The support unit according to claim 2, wherein the first extension extends, to the second support, by a length greater than a length of the second extension.

5. The support unit according to claim 1, wherein the first stress support extends to form a bilateral symmetrical structure based on the connector unit.

6. The support unit according to claim 1, wherein the connector unit and the first stress support are made of material having a high heat transfer coefficient.

7. The support unit according to claim 1, wherein the first stress support has a constant diameter.

8. The support unit according to claim 1, wherein the second stress support is perpendicular to the second end of the first stress support.

9. The support unit according to claim 1, wherein the first support plate extends horizontally and has a substantially planar shape.

10. The support unit according to claim 1, wherein the first stress support is provided with a ball joint on the first end the first stress support.

11. The support unit according to claim 1, wherein the second support plate has a width and a height greater than a width and a height of the second stress support.

12. The support unit according to claim 1, wherein, when a length corresponding to a diameter of the casing is L, the first stress support extends a length of at least 2L/3.

13. The support unit according to claim 1, wherein the connector unit comprises:
a first connector unit coming into close circumferential contact with the casing; and
a second connector unit coming into close contact with a lower surface of the first connector unit, and having a size smaller than a size of the first connector unit, the second connector unit being horizontally concentric with the first connector unit.

14. The support unit according to claim 1, further comprising:
a damping unit provided on the first support plate at a position at which the damping unit faces a lower surface of the second connector unit and at which the second connector unit sags to a lowermost position.

15. The support unit according to claim 14, further comprising:
a warning sound generator provided to generate a warning sound in response to an electrical signal received when the damping unit is pressed downward by the second connector unit.

16. The support unit according to claim 1, further comprising a second bearing into which the second extension is axially inserted, the second bearing coming into rolling contact with an inner surface of the second support.

17. The support unit according to claim 1, wherein the power unit employs one of a gas turbine and a steam turbine.

18. A gas turbine comprising the support unit according to claim 1.

* * * * *